United States Patent [19]
Knowles

[11] Patent Number: 5,865,100
[45] Date of Patent: Feb. 2, 1999

[54] GAS BURNER FOR GAS FIRED BARBECUE GRILLS

[76] Inventor: Floyd M. Knowles, 3310 Enterprise Dr., Wilmington, N.C. 28405

[21] Appl. No.: 70,614

[22] Filed: Apr. 30, 1998

[51] Int. Cl.[6] .............. A47J 37/00; A47J 37/04; A47J 37/06; A47J 37/07

[52] U.S. Cl. .............. 99/340; 99/447; 99/482; 126/25 R; 126/41 R; 126/39 J

[58] Field of Search .............. 99/339, 340, 400, 99/401, 444–446, 447, 450, 481, 482; 126/25 R, 41 R, 39 J, 37 B, 27, 9 R, 9 B, 50, 73, 108; 169/65; 426/523, 466

[56] References Cited

U.S. PATENT DOCUMENTS

| | | |
|---|---|---|
| 1,395,979 | 11/1921 | Ackron . |
| 1,447,842 | 3/1923 | Fowler . |
| 1,964,372 | 6/1934 | Tugart ................................... 126/41 |
| 1,987,340 | 1/1935 | Hurlburt ............................... 158/116 |
| 2,168,388 | 8/1939 | Bemis ................................... 99/259 |
| 2,789,877 | 4/1957 | Pfundt .................................. 312/312 |
| 2,842,043 | 7/1958 | Reuland ................................ 99/259 |
| 3,040,651 | 6/1962 | Nolte, Jr. ............................... 99/446 |
| 3,369,482 | 2/1968 | Kahn et al. ........................... 99/450 |
| 3,593,647 | 7/1971 | Copeland ............................. 99/259 |
| 3,745,912 | 7/1973 | Field ..................................... 99/446 |
| 3,785,275 | 1/1974 | Keats et al. .......................... 99/446 |
| 3,797,375 | 3/1974 | Cerola .................................. 99/340 |
| 3,809,053 | 5/1974 | Navarro .............................. 126/25 R |
| 3,817,166 | 6/1974 | McLain ................................. 99/480 |
| 4,043,312 | 8/1977 | Kern .................................... 126/41 R |
| 4,108,142 | 8/1978 | Barson et al. ...................... 126/41 R |
| 4,276,869 | 7/1981 | Kern .................................... 126/41 R |
| 4,290,408 | 9/1981 | Juett et al. .......................... 126/25 R |
| 4,321,857 | 3/1982 | Best ....................................... 99/340 |
| 4,334,462 | 6/1982 | Hefling ............................... 99/400 X |
| 4,362,093 | 12/1982 | Griscom ............................... 99/339 |
| 4,403,597 | 9/1983 | Miller ................................. 126/41 R |
| 4,508,024 | 4/1985 | Perkins ................................. 99/340 |
| 4,572,062 | 2/1986 | Widdowson ........................... 99/345 |
| 4,627,408 | 12/1986 | Schlosser .......................... 126/41 R |
| 4,662,349 | 5/1987 | McKenzie et al. ................. 126/41 R |
| 4,683,867 | 8/1987 | Beatty ................................ 126/41 R |
| 4,694,816 | 9/1987 | Fabbro ............................... 126/41 R |
| 4,736,729 | 4/1988 | Beach ................................. 126/39 R |
| 4,773,319 | 9/1988 | Holland ............................... 99/446 |
| 4,862,795 | 9/1989 | Hawkins ............................. 99/446 |
| 4,869,163 | 9/1989 | Haskins ............................... 99/482 |
| 4,872,631 | 10/1989 | Rutigliano .......................... 248/313 |
| 4,909,137 | 3/1990 | Brugnoli ............................. 99/444 |
| 4,962,696 | 10/1990 | Gillis ................................... 99/340 |
| 5,070,776 | 12/1991 | Schlosser et al. ................... 99/450 |
| 5,121,676 | 6/1992 | Jurgens ............................. 99/446 X |
| 5,129,312 | 7/1992 | Berger .............................. 99/447 X |
| 5,168,796 | 12/1992 | Porton et al. ..................... 126/41 R |
| 5,195,423 | 3/1993 | Beller ................................ 126/25 R |
| 5,531,154 | 7/1996 | Perez, III .......................... 99/482 X |
| 5,676,048 | 10/1997 | Schroeter et al. ................. 126/41 R |
| 5,755,154 | 5/1998 | Schroeter et al. ................... 99/401 |
| 5,765,469 | 6/1998 | Schlosser et al. ............... 99/400 X |
| 5,768,977 | 6/1998 | Parris et al. .......................... 99/340 |

*Primary Examiner*—Timothy F. Simone
*Attorney, Agent, or Firm*—Michael E. Mauney

[57] ABSTRACT

A gas burner design to facilitate use of a gas fired barbecue grill as a smoker. A conductive metal plate is fixed above outlet holes on a gas burner so that when the gas is ignited the flames first must stream horizontally along a protruding horizontal lip on the conductive metal plate. If the gas flow is increased, the flames stream around and upward from the conductive metal plate. A depressed area is formed in the center of the conductive metal plate. Wood chips or other combustible smoking materials may be placed in this depressed area. The gas is turned on at a low rate of flow and ignited. The gas heats the metal plate, which causes the smoking materials to begin to char and smolder. The conductive metal plate also serves to distribute and diffuse the heat generated by the flames making it easier to maintain desirable lower temperatures within the grill for use as a smoker. When the gas flow is increased, the flames stream around and above the metal plate for use of the grill for conventional broiling.

11 Claims, 5 Drawing Sheets

GAS BURNER FOR GAS FIRED BARBECUE GRILLS

FIELD OF THE INVENTION

The present invention is an improved gas burner design. More specifically, this gas burner design will be used in gas fired barbecue grills to simplify the use of this barbecue grill to cook meat or vegetables by smoking.

BACKGROUND OF THE INVENTION

From time immemorial, people have cooked their food. It is reasonable to speculate that the earliest cooked food was meat cooked over an open campfire. For most of human history, the predominant way of cooking food is to suspend the food over a wood-fueled fire. As technology and civilization have advanced, other means of cooking food have been devised. Within the last century, electric ranges and ovens or gas fired ranges and ovens have been the preferred way of cooking food in affluent countries like the United States.

However, to some people, food cooked in this conventional manner lacks the savoriness of food cooked over an open flame. This has led to an atavistic cooking ritual, especially common in suburban areas, known as barbecuing. In barbecuing the cook attempts to achieve something of the particular flavors that result from cooking food over an open wood flame without the inconvenience and trouble of actually cooking it in that fashion. Although within the last third of the century much has changed in the role of men and women in industrialized countries, it may still be stated that cooking inside on the conventional range is primarily the province of women while cooking outside or barbecuing is primarily the province of men. Because this type of cooking is more of a social occasion than a required necessity, many men take pride in their skill as a "barbecue" cook. Hence, elaborate machinery is used to barbecue to make it as convenient, simple, and as fool proof as possible.

Perhaps the simplest type of barbecue apparatus is simply a fire pan with a grill suspended above it. Combustible materials are placed in the fire pan and are ignited. When the combustible materials are considered to be at an appropriate state, food, usually pork, beef, or chicken, are placed on the grill above the fire pan where the food is cooked both by radiant and convective heat. Typically, manufactured charcoal briquettes are used as the source of heat. As the meat begins to cook, rendered fat or other juices will drip off the meat onto the charcoal briquettes, sizzling and smoking. The type of briquettes employed may also contribute to the flavor of the smoke so generated. Hickory or mesquite are usually viewed as the preferred flavors, hence, hickory or mesquite briquettes are the ones most commonly found in the market. The smoke rises to mingle with the meat and impart, to some degree, a smokey flavor to the meat. Almost all supermarkets or variety stores will sell one or more grills of this type, as well as the supplies necessary for cooking on this type of grill. This is probably the preferred form for people who only occasionally cook in this fashion.

However, within the last fifteen or twenty years more elaborate barbecue equipment using gas as a heat source has become very common. Some of these gas fired grills that are connected directly to a gas source, like the natural gas lines that may be used for heating and cooking within a home. Because many areas do not have readily available natural gas supplies, portable tanks filled with a liquified gas can be used instead of a natural gas line. These tanks are usually filled with propane, hence, called "propane tanks". The smallest and least elaborate of these gas grills may sell for under $100.00. However, there are some gas grills designed for permanent installation that may cost many thousands of dollars.

These type of grills are relatively standard in design, although variations within this design are common. Ordinarily, the cooking unit itself is a relatively oblong enclosure that is split approximately in half with the upper half being hinged so that it can be opened. Centered in the enclosure is a grill or grid for support of the food. Below the enclosure is some type of heat distributing device. This device may be lava rocks, metal briquettes, grease collection pans, or other designs. A great deal of ingenuity has been expended in designing this particular feature of the grill. It is important in the functioning of the grill because the heat must be distributed evenly during the cooking process and this heat diffusion device also receives the rendered fat or other cooking juices from the meats being cooked so as to appropriately sizzle and smoke to impart the necessary flavors to the meats being cooked. Below this heat diffusion device is the heat source. Although there are electrical powered grills, the most common grill designs use a burner for a combustible gas—either natural gas or propane. In a grill that uses hickory or mesquite briquettes as the heat source, there is no heat diffusion device. However, the briquettes must be ignited and they must burn down to where the briquettes are largely covered with white ash before the temperature in the grill for cooking is viewed as appropriate. This process, depending on the type of briquettes, can take a substantial amount of time. One of the advantages of the gas fired grill is that the gas may be ignited immediately which heats the intervening heat diffusion device much quicker to the desired temperature so that cooking can begin shortly after the gas is ignited, rather than waiting for the briquettes to "age".

The conventionally designed gas grills as outlined above are not ordinarily equipped for cooking by "smoking". Certain types of food, especially fish or large types of food, such as hams or turkeys, cannot be cooked over high heat. To do so is impractical because the outside of large meat items like the ham or turkey will be scorched well before the inside is cooked. Fish, if cooked over a high heat, dries out quickly. Consequently, it is desirable to cook these types of foods over a very low heat. The heat may be too low for the natural juices to ignite and smoke, hence, it is necessary to add something to produce the smoke necessary to impart the desirable smoking flavor in the meat. There are dedicated cookers designed to cook food for a prolonged period over low heat using smoke to impart flavor. These cookers are usually called "smokers". One design of a smoker is seen in the Pfund U.S. Pat. No. 2,789,877. In this design there is an enclosed cooking space with a vented chimney at the top of the cooking space. Several grids are suspended within the cooking space on which food to be smoked will be placed. At the bottom of the cooking space is an electric heat plate. A pie pan or similar container is placed on top of the heat plate. The pie pan contains a piece of wood, wood chips, or sawdust. The heat plate is turned on, which will begin to char the wood, filling the enclosed space with smoke. Additionally, the electric heat plate can be adjusted to achieve a satisfactory cooking temperature—high enough to slowly cook the food, but low enough not to quickly overcook it before the smoke within the heated space can penetrate the food and impart the desired smokey flavor. However, for most people who will only wish to smoke food on a rare basis, the purchase of a dedicated smoker is not practical. To that end, a variety of expedients have been devised so that a regular barbecue cooking apparatus can be modified for use as a smoker. For example, the Tygart U.S. Pat. No. 1,964,379 discloses a device to be used as part of gas fired barbecue ovens. Here, there is a conventional gas fired barbecue oven. Below that oven is a separate container with a separate burner. Wood chips, sawdust, or a log will be placed in the separate container and heated by the separate burner. A flue controlled chimney will allow smoke to enter the regular barbecue oven to mingle with the food there. Another approach is seen in Haskins U.S. Pat. No. 4,869, 163. This is a smoking unit designed to be used inside a conventional gas grill. The smoking unit is a self-contained enclosed unit. At the bottom of the smoking unit are containers for wood chips or other smoke producing materials. Above that is a vented pan leading to a grill on which food would be suspended. The Haskins smoking unit would be suspended over the ordinary gas fired burners with appropriate wood chips or other combustible materials contained within the smoking unit. Food would be fixed on the grill and the entire unit closed. The gas burner would be ignited which would then heat the combustible materials producing the appropriate smoke. Because the entire unit is enclosed, it is easier to regulate the heat within the unit to an appropriate level that is hot enough to cook the food by smoking, but not too hot to cook it before sufficient time is allowed for the smoke flavors to intermingle into the food and give it the requisite desired smokey flavor. Other gas fired grills have a tray suspended between the gas burners and the permanent heat diffusion device. The tray may be slid out and sawdust, wood chips, or even commercially available liquid smoke may be loaded into the tray, the tray returned to the body of the cooker, and then the burners ignited to begin charring the combustible products within the tray to provide the requisite smoke to impart the desired smokey flavor to the food being cooked. However, each of the above designs leave something to be desired in terms of convenience of use and practicality. To that end, there is room for an improved gas burner design that permits a standard gas grill to be used as a smoker.

SUMMARY OF THE INVENTION

A conventional gas burner in a barbecue grill consists of a gas line connected to the gas source leading to a gas distribution tube. This tube can take a variety of shapes, including a circular burner or an extended approximately rectangular tube. These are two of the more common shapes. This gas collection tube is pierced with a number of small holes to allow the gas to escape. At this area of small holes the gas is ignited as it begins to mingle with the outside air. This results in a flame streaming upwards from the point of combustion. As the gas burns it produces hot air and radiant energy which rises to the heat diffusion device placed above the gas area. By controlling the flow of gas, the amount of heat produced can be varied. However, the temperature the gas burns at is constant and cannot be reduced. This is in contrast to an electrical resistance heat source where less electrical current flowing through the resistance unit will not only lower the amount of heat being produced, but the temperature at which the heat is produced. Hence, on sensitive electrical resistance units the temperature ranges from a red hot temperature which will melt aluminum, down to temperatures low enough to where the hand, at least momentarily, may be placed on the burner unit without harm. This is in contrast to a gas unit where the flame necessarily combusts and burns at a constant temperature. Adding gas does not increase the temperature of the flame, but merely increases the amount of heat produced. By varying the amount of oxygen the flame receives, the heat of combustion may be varied somewhat, but this is impractical to use to adjust the temperature in most applications.

This invention consists of a heavy, metal plate, with a recessed center portion. This plate is used as the upper surface of the burner. The lip of the metal plate extends horizontally beyond the gas outlet holes. Hence, the gas outlet holes are below and inside of the lip of this heavy metal plate. Thus, when the gas is ignited rather than streaming directly upward, it first touches and is deflected horizontally by the flat horizontal lip of the heavy metal plate of this invention. This tends to force the hot air outward and diffuse it somewhat before it begins to travel upward. If the heavy metal plate is made of a conductive metal, such as cast iron or copper, then the plate serves to absorb some of the heat generated by the flame and to radiate the heat thus absorbed. Thus, some of the energy that would ordinarily stream upward and directly heat the heat diffusion device placed in the grill will instead heat and be radiated from the heavy plate. In the center of the heavy plate there is a depressed area. Here, wood chips or other combustible materials to smoke may be placed. After the gas is ignited, but kept at a low level, the heavy metal plate will gradually heat to a temperature sufficient to cause slow combustion of the wood chips or other combustible material so that they will begin to char and smoke in the desirable fashion. This charring and smoking also absorbs some of the heat generated by the combustion of the gas. In this fashion it is possible to keep the flame on the gas burner ignited, but maintaining a low level of heat within the barbecue cooking enclosure. This is desirable where smoking must take place at a low temperature. In this burner design, when a high temperature is desired for regular barbecuing, the flow of the gas is increased. This produces larger flames which quickly stream around the lip of the present invention to flow directly upward to heat the heat diffusion device to sufficient temperature so that cooking of steaks, chops, or other pieces of meat by a quick charring is a desirable result. This simple, but ingenious, modification of a standard gas burner can convert any gas fired grill to an effective smoking cooker without further modifications. It does not substantially affect the overall efficiency of the barbecue unit when used for standard barbecuing, but is a simple and convenient way of using the barbecue unit as a smoker when so desired.

DETAILED DESCRIPTION OF THE DRAWINGS

Figure 1:
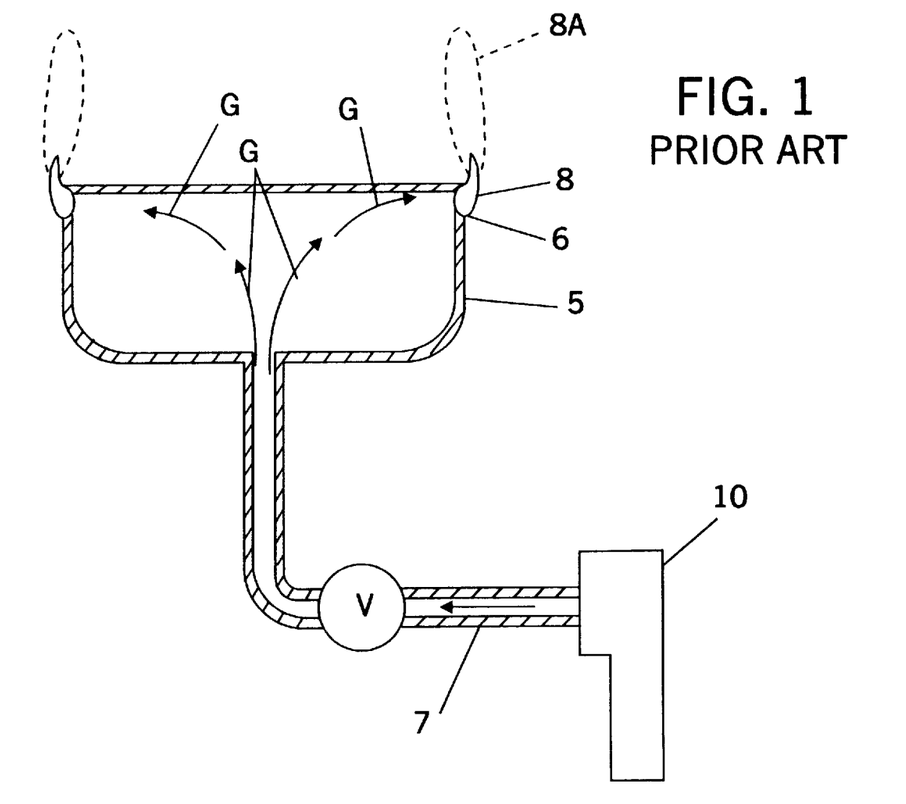
FIGS. 1 and 1A show a prior art gas burner.
Figure 1A:
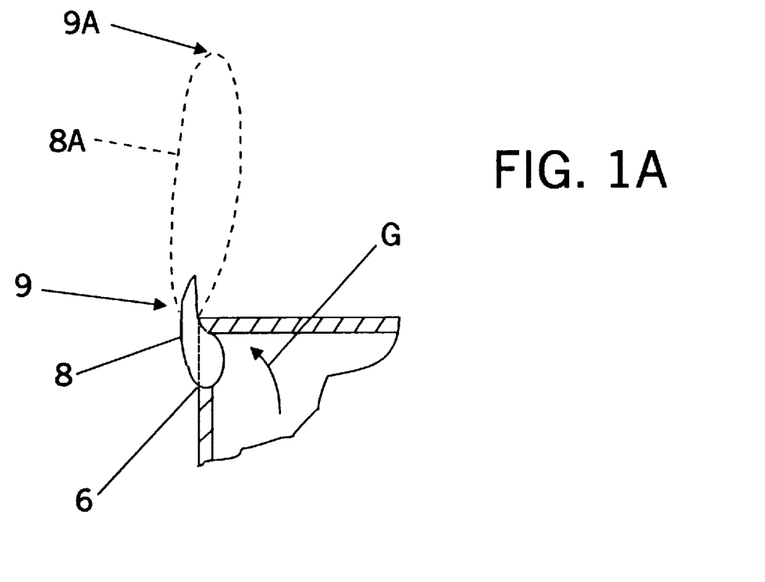

FIG. 1 and FIG. 1A show in a side cut-a-way simplified view a gas burner of conventional design. FIG. 1 shows the burner and FIG. 1A shows a detail of the gas flame of FIG. 1. Gas burner designs vary widely depending on the type of grill. However, each gas burner will have a source of the gas to be burned, typically a gas reservoir tank (10). There will be a tube (7) or other gas transmission means leading from the gas reservoir tank (10) to the gas burner (5). The gas will leave the gas reservoir tank (10) passing through the tube (7) to the gas burner (5). The combustible gas here is shown as a series of arrows labeled with the letter "G". There are gas outlet holes (6) placed along the gas burner (5). The gas burner may consist of a hollow rectangular tube, a circular burner or a variety of other shapes which may to some degree depend on the design of the grill. However, interspersed along the gas burner (5) are the gas outlet holes (6), ordinarily at or in proximity to an upper surface of the gas burner (5). The combustible gas (G) is under pressure and will seek to escape through the gas outlet holes (6) into the less pressurized surrounding atmosphere. Once the pressurized combustible gas (G) escapes through the gas outlet hole (6), it may then be ignited by an open flame like a match or lighter or by a piezoelectric igniting device commonly found on many gas grills. The purpose of this igniter is simply to produce a high enough temperature to ignite the combustible gas (G) as it leaves the gas outlet hole (6). Once ignited, the combustible gas (G) produces a flame (8).

The temperature of the resulting flame (8) can to some degree be controlled by where and how it mixes with the oxygen. However, most gas burner designs suggest an optimum mixing of oxygen and combustible gas to produce the highest flame temperature in the flame (8) possible for that particular combustible gas (G). The highest temperature possible is deemed desirable because less gas (G) will be required to produce the appropriate cooking temperatures. Thus the gas burner (5) is usually designed with an oxygen inlet somewhere along the gas distribution tube (7) or in the burner (5) to allow some premixing of air; hence oxygen, with the gas (G). However, typically the instructions on grills that have this kind of device recommend that the owner adjust the oxygen inlet until the flame displays characteristics of full combustion, ordinarily denoted by the color of the flame, then leave the oxygen mixing device set at that setting for the life of the grill. Ordinarily the oxygen mix is not used to control the temperature of the flame. Most grills will have a valve (V) to control the flow of the combustible gas (G) to the gas burner (5). For a few grills, this is simply on or off, but most have a provision to allow the owner of the grill to increase over a continuous range the amount of gas going to the burner. Hence when the valve is turned low, a low flame is produced as is denoted in FIG. 1A by the number (8). By increasing the gas flow by opening the valve will result in a much larger gas flow, hence, much larger flame (8A). By increasing the gas flow more gas is combusted, hence, more hot air for convective heating is produced. A larger flame is produced, hence there is a greater radiant heat produced by the flame. However, the temperature of the flame remains the same. Increasing the gas flow does not increase the heat of combustion ordinarily without otherwise altering the air/gas mix. The highest temperature is achieved at the point of the top of the visible flame. In FIG. 1A this is denoted by the FIGS. 9 and 9A respectively depending on the amount of gas flow through the gas outlet hole (6).

The gas combusts at a temperature far higher than is required for cooking. For that reason, almost all gas barbecue grills have some kind of heat diffusion device (seen in FIG. 5) between the flame and the grill's cooking surface. One common heat diffusion device are rough volcanic stones approximately the size of the charcoal briquette. They are commonly called lava rocks. They are supported on a grid between the burner and the cooking grill in a common barbecue grill. Other grills use a metal plate of a particular design (for example, see Kearn U.S. Pat. No. 4,276,869). Others use angled metal plates, which not only help distribute the heat, but also prevent pooling of grease thus, preventing grease fires (for example see Beatty U.S. Pat. No. 4,683,867). If too high a cooking temperature is used, the outside of the food to be cooked will be charred and burned while the inside will still be uncooked. Because the gas burns at a high temperature, this creates a problem in adopting a gas grill to be used as a smoker. Smoking takes place at a much lower temperature than does grilling. Moreover, the combustible materials that are used to produce the smoke, wood chips, sawdust or the like, must not be raised to such a temperature that they would actually flame up and burn. Rather, they should smolder and char. It is the incomplete combustion of the wood chips or other combustible materials that produce the smoke, hence the desirable smoky flavor. Also, if the wood chips char too quickly, they must be replenished at a regular interval and the quality and quantity of the smoke produced may also be reduced.

Typically, a variety of expedients are used to avoid this problem. The wood chips may be soaked in water to slow their combustion rate. Or they may be wrapped in some insulating material like aluminum foil. Ordinarily the wood chips must be placed at some distance from the actual flame itself. In some barbecue grills, this is accomplished by a tray in the firebox which is between the gas burner and the heat diffusion device. Sometimes other people simply wrap the wet wood chips in aluminum foil and place them on top of the heat diffusion device like lava rocks, grease collection pan, or metal shield. All of these expedients work to a greater or lesser degree. However, none are completely satisfactory. A problem that none of these expedients address is adjusting the overall temperature in the barbecue grill to a desirable low temperature so that the smoking will take place over a long enough period of time for the smoky flavor to penetrate more than the superficial surface of the food to be cooked but still causing sufficient combustion of the wood chips or other smoke source. Such things a cooking hamburgers or steaks or barbecuing chicken over a grill ordinarily takes a matter of minutes, but smoking a ham or turkey or bluefish takes hours.

Figure 2:
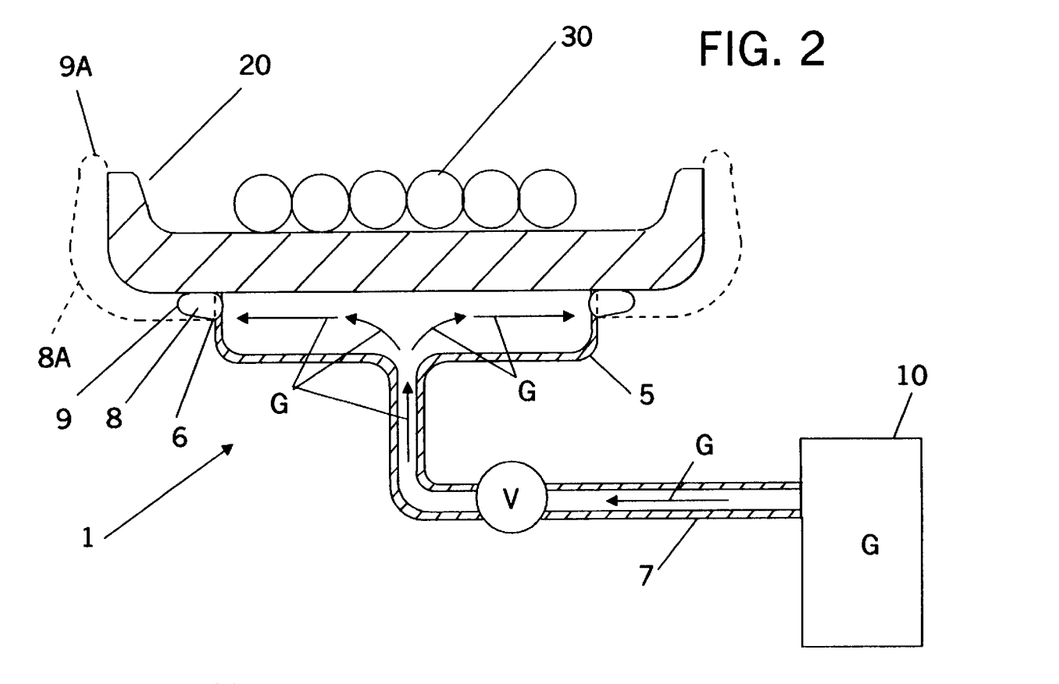
FIGS. 2 and 2A is a cut-a-way side view of a simplified example of a gas burner design employing the current invention.
Figure 2A:
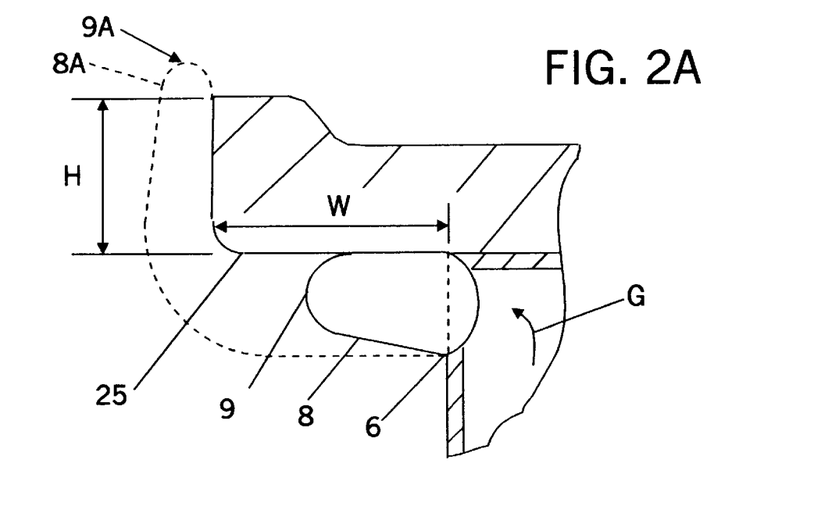

FIG. 2 shows in a cutaway side view of a simplified example of a gas smoker burner (1) employing the principles of the current invention. As before there is a gas reservoir (10) for the combustible gas (G) which passes along a tube (7) through a control valve (V) to the gas burner (5). Gas escapes from the burner at gas outlet holes (6) and is ignited into a flame (8). However, a large metal plate (20) of conductive metal like cast iron is placed on and becomes the upper surface of the burner (5). The underside of the plate (20) extends beyond and above the gas outlet hole (6) so that the flame (8) first must impact on and flow along the underside of the plate (20). If the amount of combustible gas (G) is increased by increasing the flow of the gas through the valve (V), then a larger flame (8A) is produced as is shown in dotted lines in FIG. 2 and in FIG. 2A. The protruding lip (25) of the plate (20) extends from the gas outlet holes (6) for a horizontal distance (W) shown in FIG. 2A. The plate (20) then goes up a vertical distance of the side of the plate (20), denoted as (H) shown in FIG. 2A. These distances are important for the functioning of the device. The distance (W) must be large enough so that when the flame (8) is adjusted to a low level the point of complete combustion (hence highest temperature (9) is still smaller than the distance (W) as is shown in FIG. 2A). However, the distance (W) must not be so large to prevent at a higher gas flow the flame (8A) to stream completely around the lip (25) and above the vertical distance (H) so that the point of highest temperature (9A) extends above and beyond the plate (20).

When the flow of the combustible gas (G) is kept at a low level by the valve (V) as is shown by the flame (8), the radiant heat of the flame (8) is shielded by the plate (20). The heated air produced by the flame (8), primarily at this point of the highest temperature (9), must first stream around the remaining protruding lip (25) and up the vertical side (H) of the plate (20). Hence, the flame (8) first primarily heats the plate (20) before the convective hot air rises to begin to heat the heat diffusion device (not shown) which is placed between the gas burner (5) and the cooking surface. The plate (20) is heated by the hot air produced by the flame (8). This heat is conducted throughout the plate (20) because of the conductive nature of the preferred cast iron construction. The plate (20) will also begin to radiate heat. However, the overall heat produced by the flame (8), both by convection and by radiation will first heat the plate (20). The plate (20) will then radiate heat, will also heat the air around it, but there is an inevitable loss because of friction and entropy effects, hence, the overall heating produced by the flame (8) within the barbecue grill is reduced. Moreover, the radiant and conductive heat of the flame is deflected and spread over a much wider area which helps avoid hot spots on the heat diffusion device. These are all desirable effects for smoking. Wood chips (30) are placed within the depressed center of the plate (20). They will be gradually heated by the plate (20) as it heats and begin to char and smolder producing the desired smoke within the enclosed barbecue grill. The introduction of the plate (20) as the upper surface of the burner (5), not only provides a convenient place to place the combustible wood ships (30), but also makes regulation of the overall heat within the gas grill easier, hence, facilitates control of the combustion rate of the wood chips (30) and of the cooking temperature within the grill.

However, when the grill is desired to be used as a standard barbecue grill, where high heat is desirable for such things as charring steaks or hamburgers, the gas flow is increased so that a larger flame (8A) is produced as is shown in dotted lines in FIGS. 2 and 2A. This flame will stream completely around both the horizontal and vertical surfaces of the plate (20). Hence the flame extends above the vertical lip of the plate (20) and at its point of highest temperature (9A) and maximum combustion will be completely above the lip of the plate (20). Thus, the plate (20) will not affect the heating results of the gas flame nearly as much as when the flame is kept at a lower level (8). There will be direct radiant heat as well as a direct flow of hot air from the point of highest temperature (9A) to the heat diffusion device above the burner but below the grill. Thus, by appropriate regulation of the horizontal distance (W) and the vertical distance (H), the gas burner of the current design functions almost like the prior art when the gas flow is at a higher level as is shown by the flame size (8A), but functions very effectively as a smoker device when the flame is kept at a lower level as is shown in flame (8).

Figure 3:
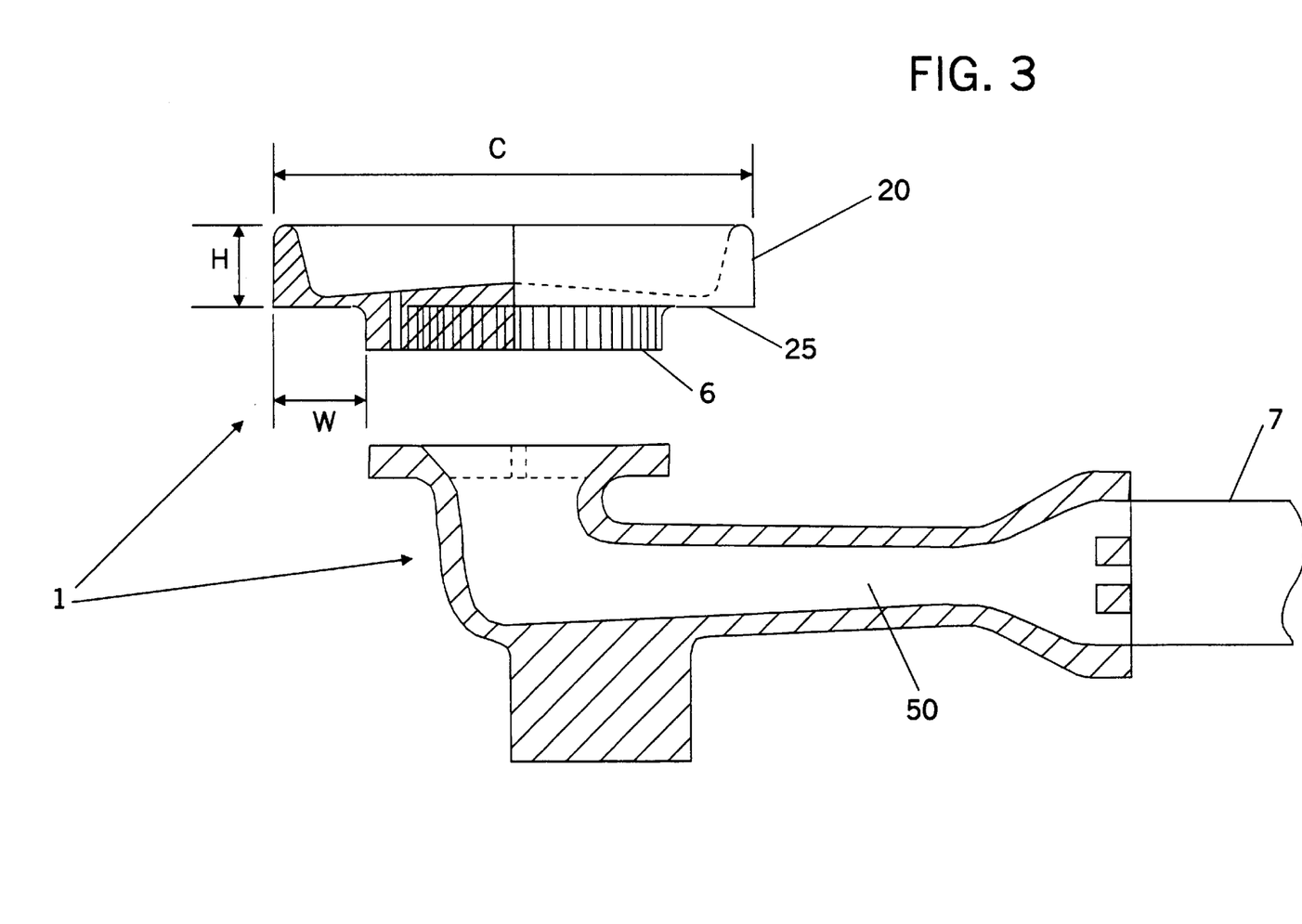
FIG. 3 is a cut-a-way side view of one preferred embodiment of this invention.

Shown in FIG. 3 is a cut-a-way side view of one preferred embodiment of this gas smoker burner (1) constructed as a circular gas burner. It is constructed of two pieces. First is a gas collection tube (50) connected to the gas transmission tube (7). Gas flows from the gas tank (10), not shown, through a valve (V), not shown, to the gas collection tube (50). There it passes through the bore into the tube. The plate (20) is bolted in two places to the gas transmission tube (50). Gas escapes through the gas outlet holes (6) which are arranged in a circular manner. As the gas streams out of the outlet hole (6), it is ignited and first impinges on the heavy metal protruding lip (25) of the underside of the plate (20). Until the flames are more than the distance (W), they remain on the underside of the plate (20). In this embodiment, the distance (W) is one inch. If the gas flow is increased sufficiently so that the flames then begin to extend beyond the one inch distance (W), they will then flow upward along the vertical sides of the plate (20) for the distance (H), also one inch. When the gas flow is on high, the flames will extend completely around and above the plate (20), in effect producing a circular burner with the effective diameter of (C), in this embodiment six inches. The plate (20) is constructed of heavy cast iron. As can be seen in the cutaway portion, there is a hollow bowl-like area. This bowl area will ordinarily be pierced with drain holes (seen in FIG. 4) to allow any liquid collecting therein to drain out into the bottom into the firepan of the grill. Additionally, the center of the bowl will be somewhat higher and will slope outward and downwardly, again to facilitate drainage of any liquids to the holes placed in the bottom of the plate (20).

Figure 4:
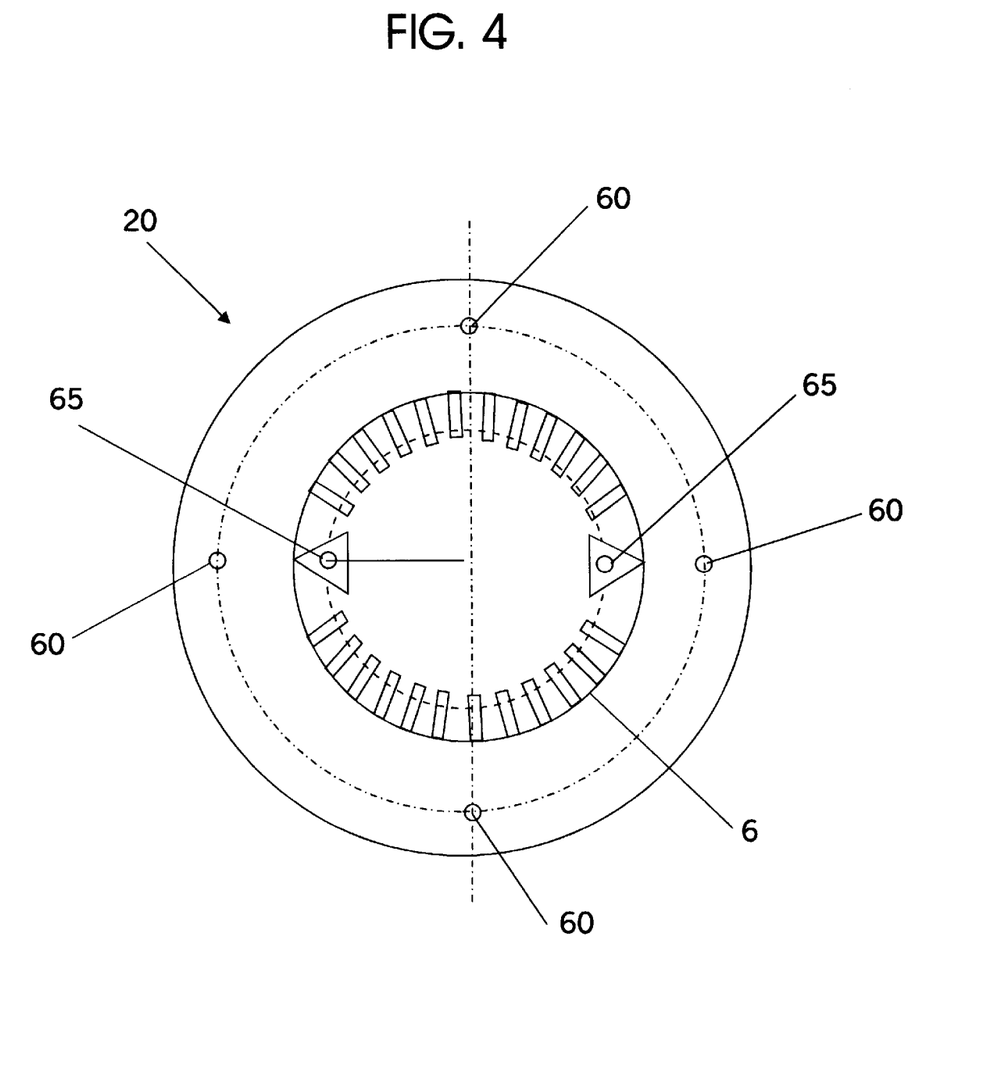
FIG. 4 shows one preferred embodiment from above with a portion shown in cut-a-way.

FIG. 4 shows the plate (20) as seen from above. There are four drainage holes (60) and two bolt holes (65). The drainage holes are arranged symmetrically at the four points of the compass at the low part of the sloped inside portion of the plate (20). The center portion of the plate (20) is cut-a-way for better visualization of the gas outlets (6) which are seen as the circular gear like arrangement within the cut-a-way portion of the plate (20). Bolts will pass through the bolt holes (65) to connect the plate (20) to the gas transmission tube (50) (seen in FIG. 3). This disclosed embodiment of the gas smoker burner (1) is a circular gas burner. This is a common shape in gas fired barbecue grills. However, the principles of the current invention employing a heavy conductive plate with a lip extending out from and above the gas outlet holes could be used in any shape gas burner design that employs gas outlet holes interspersed along a gas distribution tube or similar device.

Figure 5:
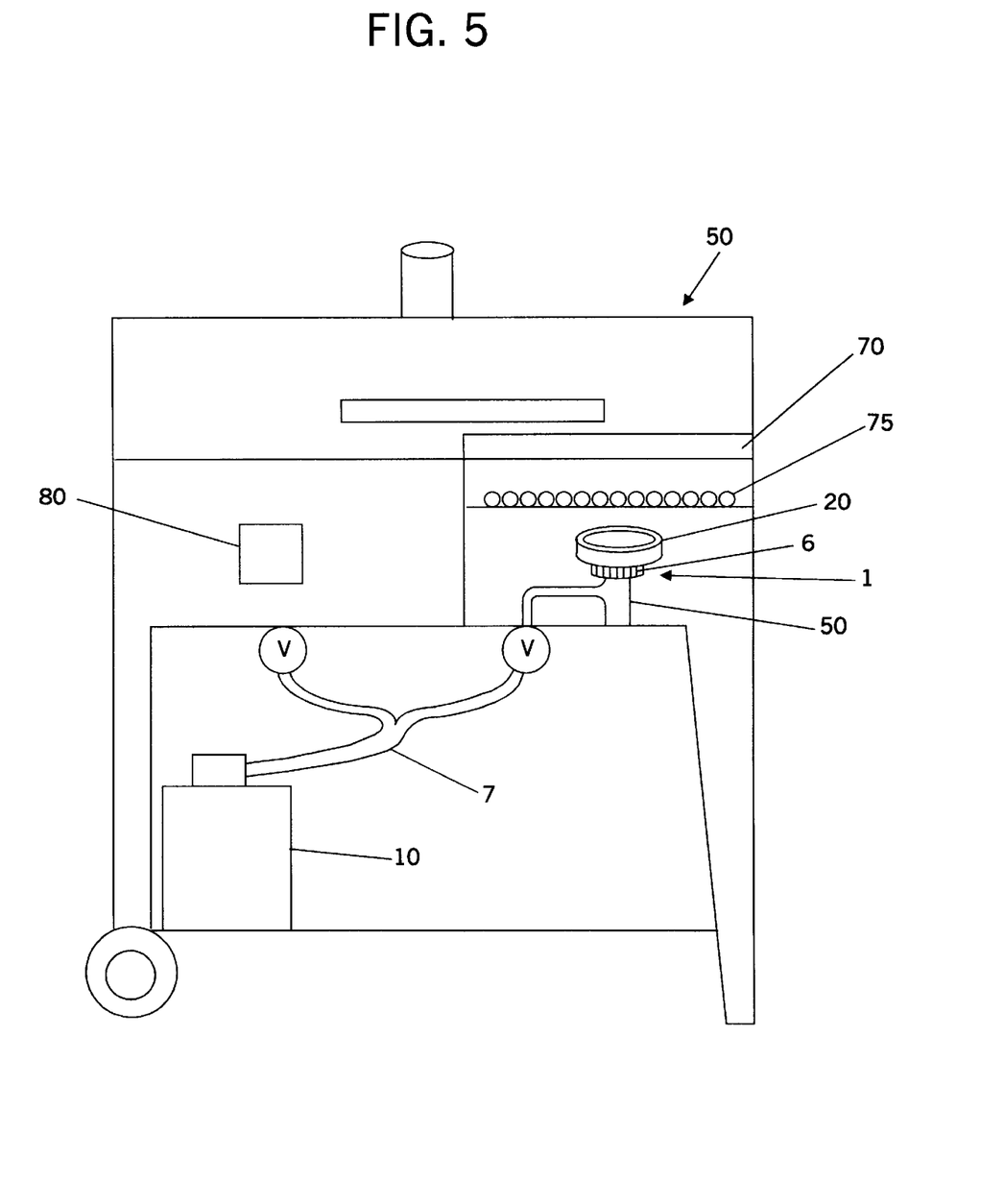
FIG. 5 shows a standard gas fired barbecue grill with a potion cut-a-way to show the current invention burner design.

FIG. 5 shows the current commercial embodiment of the burner smoker design (1) inside a standard design gas fired barbecue grill (50). At the bottom of the grill (50) and resting on a plate is the propane tank (10) connected to the gas transmission tube (7). The gas transmission tube (7) splits into two parts to flow to two different burners arranged symmetrically in the grill (50). The right portion of the grill is shown in cutaway. The gas transmission tube (7) passes through the control valve (V) into the gas collection tube (50). The gas smoker burner (1) is assembled and the plate (20) is bolted into place onto the gas collection tube (50). The gas outlet holes (6) are seen as a series of slots immediately below the plate. Above the burner is the heat diffusion device (75), in this case shown as a series of lava rocks and above that is the grill surface (70) where the meat will be placed to be cooked. Typically, there will be a means of access to the gas smoker burner (1) shown here as a sliding door (80) placed on the grill (50). This will allow access to the top surface of the plate (20). The sliding door (80) is opened, wood chips or other smoking materials are placed within the bowl of the plate (20), the gas valve turned on, the burner ignited at the gas outlet holes (6), the gas valve adjusted to keep the gas flame at a desirable low level and the door closed. The food placed on the grill (70) can then be smoked at a desirable temperature. It is an easy matter to replace the smoking materials inside of the bowl of the plate (20) as necessary. However, for ordinary grilling, no smoking materials will be placed within the bowl (20) and the gas valve (V) will be adjusted to produce a higher flame which will stream around and above the plate (20).

Thus, by both radiant and convective means, the heat diffusion devices, in this case lava rocks (75), are heated to the desired temperature. Steaks or hamburger placed on the grill (70) will cook in appropriate fashion so that their juices will drip onto the lava rocks, sizzle and flame to produce the required smoky grilled flavor in ordinary grilling.

I claim:

1. A gas burner design for gas fired barbecue grills to adopt a barbecue grill for use as a smoker comprising:
   (a) a gas distribution tube pierced with gas outlet holes;
   (b) means for transmission of a combustible gas from a gas source to said gas distribution tube;
   (c) a conductive metal plate affixed above said gas distribution tube, said conductive metal plate having a horizontal lip above and extending outwardly from said gas outlet holes in said gas distribution tube whereby burning gas from said gas outlet holes impinges upon said horizontal lip and flows horizontally along said lip;
   (d) a vertical lip on said conductive metal plate extending upwardly from a surface of said metal plate and enclosing an area on said conductive metal plate;
   (e) a bowl like area in said conductive metal plate inside of said vertical lip whereby combustible materials may be placed in said bowl like area;
   (f) means for controlling the flow of a combustible gas to said gas distribution tube so that said flow of combustible gas may be kept at a first level of flow so that if combustible gas is ignited, then resulting gas flames stay below said horizontal lip and so that said flow may be kept at a second higher level of flow so that if combustible gas is ignited resulting gas flames stream across said horizontal lip and upwardly above said vertical lip;
   whereby smoking materials may be placed in said depressed area at said first level of flow of combustible gas so that a barbecue grill equipped with said gas burner design may be used as a smoker and at said second higher level of flow a barbecue grill with said gas burner design functions as an ordinary barbecue grill.

2. A gas burner design for gas fired barbecue grills to adopt a barbecue grill for use as a smoker of claim 1 wherein said vertical lip is at an edge of said metal plate and extends entirely around said metal plate.

3. A gas burner design for gas fired barbecue grills to adopt a barbecue grill for use as a smoker of claim 2 wherein said horizontal lip extends outwardly at least one inch from said gas outlet holes.

4. A gas burner design for gas fired barbecue grills to adopt a barbecue grill for use as a smoker of claim 3 wherein said vertical lip extends upwardly at least one inch.

5. A gas burner design for gas fired barbecue grills to adopt a barbecue grill for use as a smoker of claim 4 wherein said bowl like area in said conductive metal plates is pierced with at least one hole whereby liquids will drain from said bowl like area.

6. A gas burner design for gas fired barbecue grills to adopt a barbecue grill for use as a smoker of claim 5 wherein said means for controlling the flow of a combustible gas provides for continuous adjustment of said flow of combustible gas.

7. A gas burner design for gas fired barbecue grills to adopt a barbecue grill for use as a smoker of claim 6 wherein said conductive metal plate is made of cast iron.

8. A gas burner design for gas fired barbecue grills to adopt a barbecue grill for use as a smoker comprising:
   (a) a gas distribution tube with a circular arrangement of gas outlet holes;
   (b) means for transmission of a combustible gas from a gas source to said gas distribution tube;
   (c) a circular conductive metal plate affixed above said gas distribution tube, said circular conductive metal plate having a diameter 50% larger than a diameter of said circular gas outlet holes;
   (d) a vertical lip along a circumference of said circular conductive metal plate, said vertical lip having a vertical height of one-sixth of the diameter of said circular metal plate;
   (e) a bowl like area in said conductive metal plate inside of said circumferential vertical lip whereby combustible materials may be placed in said bowl like area;
   (f) means for controlling the flow of a combustible gas to said gas distribution tube so that said flow of combustible gas may be kept at one level of flow so that gas flames stay below said horizontal lip and inside said circumference of said circular conductive metal plate.

9. A gas burner design for gas fired barbecue grills to adopt a barbecue grill for use as a smoker of claim 8 wherein said circular arrangement of gas outlet holes has a diameter of four inches.

10. A gas burner design for gas fired barbecue grills to adopt a barbecue grill for use as a smoker of claim 9 wherein said bowl like area in said conductive metal plate has at least one hole whereby liquid materials may drain from said bowl like area.

11. A gas burner design for gas fired barbecue grills to adopt a barbecue grill for use as a smoker of claim 10 wherein said means for controlling the flow of a combustible gas allows for continuous adjustment of said flow of a combustible gas whereby gas flames may be adjusted to stay below said horizontal lip and inside said circumference of said circular conductive metal plate and said flow may be increased so that gas flames stream around said horizontal lip and above said vertical lip of said circular conductive metal plate.

* * * * *